United States Patent [19]
Kondo et al.

[11] Patent Number: 4,826,019
[45] Date of Patent: May 2, 1989

[54] HANDLING APPARATUS FOR MAGNETIC RECORDING DISKS

[75] Inventors: Thomas J. Kondo, Phoenix; James F. Kusbel, Scottsdale; John D. Philp, Phoenix, all of Ariz.

[73] Assignee: Three Phoenix Company, Phoenix, Ariz.

[21] Appl. No.: 565,036

[22] Filed: Dec. 23, 1983

[51] Int. Cl.$^4$ .................. B07C 5/344; G01R 33/12
[52] U.S. Cl. .................... 209/538; 209/567; 209/573; 209/933; 324/212; 360/25; 360/99.01; 369/58
[58] Field of Search ............ 209/538, 546, 549, 551, 209/552, 559, 562–564, 567, 568, 571, 573, 600, 655, 698, 706, 914, 933; 324/210–212; 360/25, 99; 364/481, 579, 580; 369/58

[56] References Cited
U.S. PATENT DOCUMENTS

| | | | |
|---|---|---|---|
| 2,338,400 | 1/1944 | Bogue | 209/706 X |
| 3,303,931 | 2/1967 | Vaughan et al. | 209/573 |
| 3,678,481 | 7/1972 | Dalziel et al. | 360/99 |
| 3,686,682 | 8/1972 | Behr et al. | 360/25 |
| 3,780,873 | 12/1973 | Silva | 271/149 X |
| 3,781,835 | 12/1973 | Dion et al. | 360/25 |
| 4,089,029 | 5/1978 | Castrodale et al. | 360/99 |
| 4,177,491 | 12/1979 | Jahn | 360/99 X |
| 4,228,387 | 10/1980 | Brown | 360/99 X |
| 4,234,418 | 11/1980 | Boissicat | 209/573 X |
| 4,347,535 | 8/1982 | Dalziel | 360/99 |

OTHER PUBLICATIONS

IBM Technical Disclosure Bulletin, vol. 22, No. 3, pp. 905–906, Aug. 1979, A. T. Fletcher and L. K. Whitted.
IBM Technical Disclosure Bulletin, vol. 22, No. 3, pp. 907–909, Aug. 1979, A. T. Fletcher, R. W. Holmes, W. A. Maurer and L. K. Whitted, 324–212.

Primary Examiner—Robert B. Reeves
Assistant Examiner—Edward M. Wacyra
Attorney, Agent, or Firm—Harry M. Weiss

[57] ABSTRACT

An automatic disk positioning apparatus and method for its use in handling of flexible disks in an automatic testing apparatus is disclosed. The apparatus includes a gravity feed disk hopper and vacuum disk plate which sequentially present a series of disks for test. Each disk drops by gravity from the vacuum disk plate to a test position including a drive mechanism. The drive mechanism rotates the disk, in its disk jacket, at a predetermined rotational speed for testing. Each disk is tested and the test results are stored in memory. After testing the disk is automatically sorted and stored in an output container based on the test results. The sorting is accomplished by dropping the tested disk into a motor driven shuttle which conveys the disk to the proper output container and drops the disk into that container.

47 Claims, 4 Drawing Sheets

HANDLING APPARATUS FOR MAGNETIC RECORDING DISKS

BACKGROUND OF THE INVENTION

This invention relates generally to apparatus and method for testing flexible disks, and more specifically to an automated equipment method for testing and sorting flexible disks.

FIELD OF THE INVENTION

Flexible disks are used for mass storage in computer applications. The disks may be, for example, 5¼ inches in diameter, 8 inches in diameter, or about 3 inches in diameter. The disks are used to store many thousands of bytes of computer information. In some applications, information is stored on one side of the disk, while in other applications information is stored on both sides of the disk. Information storage must be precise and totally accurate. This requires that the disk, in turn, be of high quality without flaws. To insure that disks are of such quality, each disk used in a computer application must be carefully tested and screened for quality control.

Disk testing can be time consuming, which, of course, adds to the final cost of the disk. To reduce the testing costs, it is imperative that disk testing be done as rapidly as possible and with as little operator input as possible. There is therefore a need for a testing apparatus and method which would automatically test and sort a plurality of flexible disks in a rapid manner without requiring large amounts of operator handling.

It is therefore an object of this invention to provide an improved and automated disk testing apparatus.

It is a further object of this invention to provide an automated method for testing flexible disks.

It is another object of this invention to provide an improved feed hopper for a flexible disk testing apparatus.

It is another object of this invention to provide an improved method for loading a plurality of flexible disks into a testing apparatus for testing flexible disks.

It is yet another object of this invention to provide an improved test station for an automated flexible disk testing apparatus.

It is another object of this invention to provide an improved method for handling and testing disks at a test station of an automated flexible disk testing apparatus.

It is yet another object of this invention to provide an improved apparatus and method for sorting and binning flexible disks tested in a flexible disk testing apparatus.

BRIEF SUMMARY OF THE INVENTION

The foregoing and other objects and advantages are achieved with the automated disk testing apparatus and method, both in accordance with the invention. The automated disk testing apparatus includes a gravity feed hopper into which a plurality of flexible disks, in standard jackets, are loaded. The standard jacket that is referred to is the American National Standard Institute (ANSI) specified in their document number X3B8/82-39 dated June 11, 1982. The standard jacket disclosed herein is preferably tested with its top flap opened up or in an unsealed position to permit easier access to the flexible disk contained therein, but it can also permit testing with top flap closed or sealed. A vacuum disk plate pulls disks from the hopper, one at a time, and drops them into a drive mechanism. The drive mechanism positions and clamps the disks and then rotates the disk at a predetermined rotational speed for testing. During testing the rotating disk is contacted by two disk test heads (one on each side of the disk with each head having two read/write cores) which performs the necessary tests and stores the test result. The apparatus then disengages the disk from the drive mechanism and drops it into a sort shuttle frame. The sort shuttle frame transports the disk to a location over a preselected output bin, selected in response to the stored test results, and releases the disk into that selected bin.

DETAILED DESCRIPTION OF THE INVENTION

Figure 1:
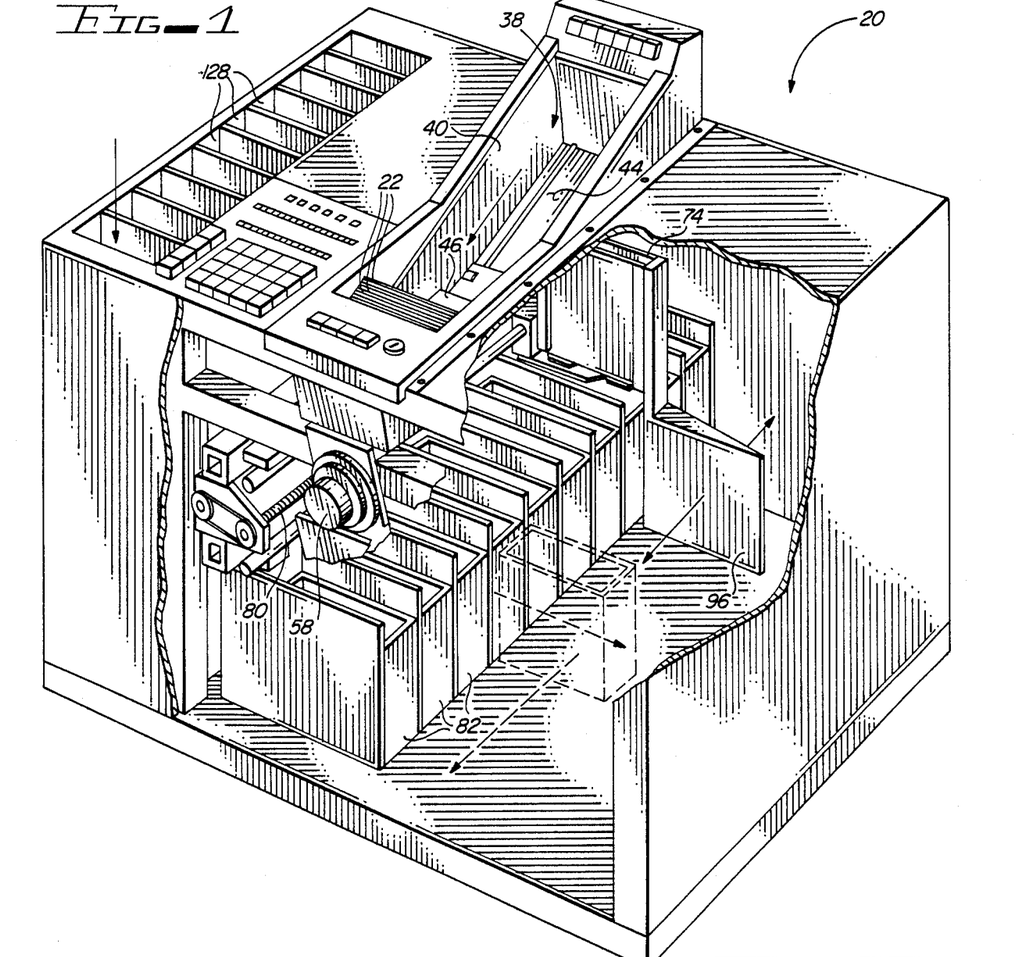
FIG. 1 illustrates automated test equipment in a partially cut away perspective view.

Automated disk testing apparatus 20 is illustrated in FIG. 1 in a partially cut away perspective view. This apparatus provides for the rapid testing and sorting of a plurality of flexible disks. A preferred embodiment of the disk testing apparatus will be described, although it is not intended that the invention be limited to this preferred embodiment. Those skilled in the art will of course recognize that variations and modifications differing from this preferred embodiment can be made without departing from the spirit and scope of the invention.

Figure 2A:
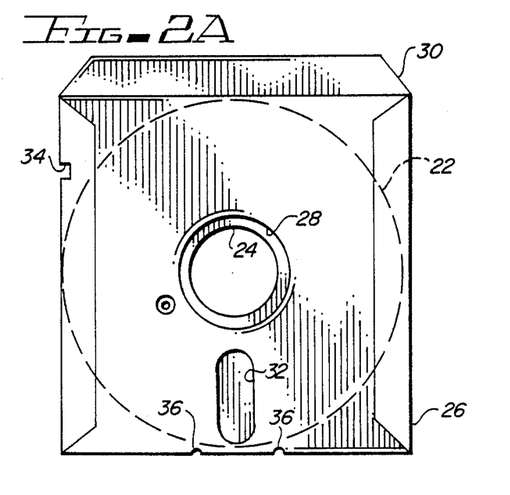
FIGS. 2a and 2b illustrate the flexible disk to be tested in its standard disk jacket.
Figure 2B:
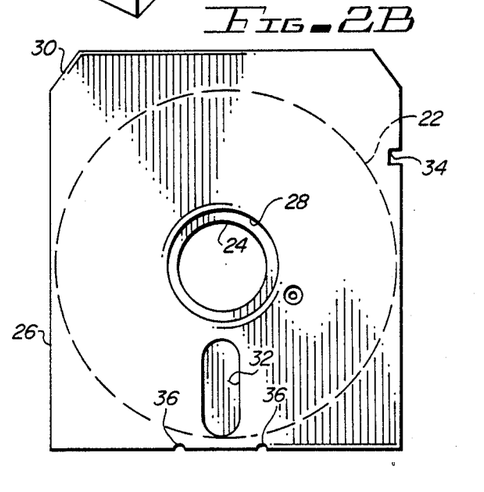

FIGS. 2a and 2b illustrate the front and back, respectively, of a standard 5.25 inch double sided flexible disk 22. It is just such a disk that is intended to be tested by apparatus 20. Apparatus 20, however, can be adapted for the testing of similar disks of different size by appropriate changes in the size of the apparatus. Disk 22 has an aperture 24 through the center thereof. The disk is contained in a standard disk jacket 26. The disk jacket similarly has an aperture 28 through the center thereof exposing the aperture 24 in the disk. Jacket 26 is here shown with jacket flap 30 in the open or up position. The apparatus allows for testing with the jacket flap either open or closed. The jacket also includes a head window opening 32 which exposes a portion of the tracks on the surface of disk 22. A Write Control notch 34 appears on the upper portion of one side of the jacket. This notch is operative during normal use of the disk in a read/write mode. Relief notches 36 also appear at the bottom of the disk jacket.

Figure 3:
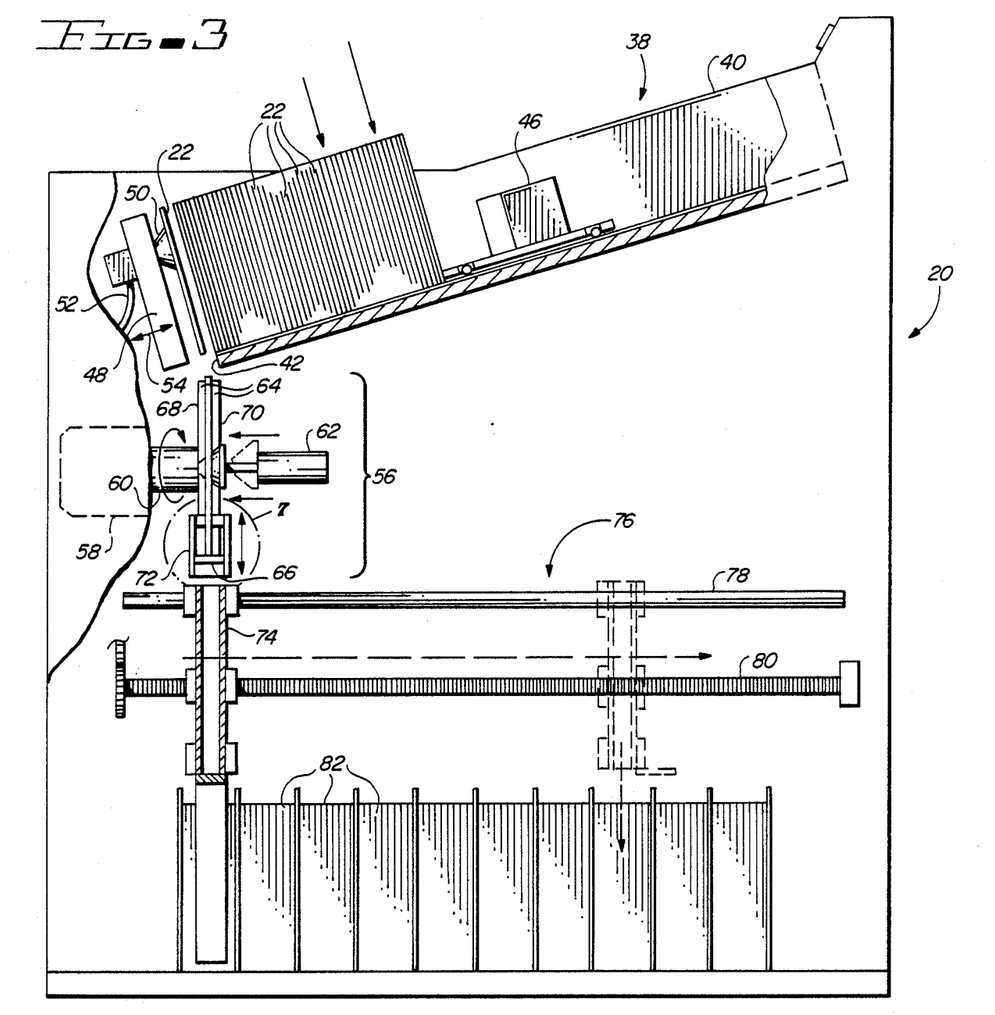
FIG. 3 illustrates, in cross-section, operative portions of the disk testing apparatus.

FIG. 3 illustrates test apparatus 20 in cross section. Preferably a 15 degree angle is used to orient test station 56, shuttle platten 74 and boxes 82 to be in allignment with the 15° angle of input hopper 38, however, for illustrative purposes, the test station 56, shuttle platten 74 and boxes 82 are depicted in a vertical orientation. In operation, a plurality of disks 22 are loaded into the input hopper 38 of the apparatus. The input hopper includes an incline channel 40 in which the disks, in their disk jackets, stand crosswise of the channel with the broad faces of the disks perpendicular to the length of the channel. The channel has a width to easily accommodate the width of the disks and to keep the disks aligned but without binding against the channel edges. Stops at the bottom end of the channel (not shown in this view) contain the disks within the channel until a disk is removed for testing. The incline of channel 40 causes the disks to be pushed by gravity against the stops at the bottom 42 of the channel. To ease the movement of the disks down the incline channel, slide means 44 are positioned on the bottom of the channel. The slide means can be, for example, a pair of highly polished stainless steel rods which protrude slightly above the bottom surface of the channel. A slide weight 46 pushes against the rearmost of the disks to keep the disks compact against the stops at the end of the channel. Slide weight 46 slides by gravity on slide rods 44.

Positioned near the lower end of channel 40 is a vacuum disk plate 48 having a vacuum suction cup 50 extending from the front surface thereof. The vacuum cup is coupled to a vacuum source (not shown) by a vacuum hose 52. The vacuum disk plate is moveable back and forth along a direction parallel to the long dimension of the channel as indicated by double ended arrow 54. The vacuum disk plate can move, for example, by preferably pneumatic control on bearing rods (not shown). Control of the vacuum disk plate 48 and of the vacuum supplied to the vacuum cup 50 is by a microprocessor unit which by means of its control program coordinates the various elements of the testing apparatus.

At the prescribed time the vacuum disk plate moves forward to contact the flexible disk located at the lower end of the incline channel. A sensor (not shown) indicates contact between the vacuum suction cup and the face of the disk. The vacuum is activated and the vacuum disk plate moves away from the end of the incline channel to pull the flexible disk past the stops at the end of the incline channel. The vacuum disk plate stops its motion away from the incline channel when the disk is located directly over the test station 56. When thus properly located, and in response to a signal from the controlling microprocessor unit, the vacuum is released to allow the disk to drop into the test station.

Test station 56 includes a fixed mount drive motor 58 which provides a controlled rotation of disk drive spindle 60, and a retractable cone-nosed idler collet 62. The disk is dropped into a frame 64 having channel shaped sides and moveable bottom means 66 for initially limiting the vertical travel of the disk.

Motor 58 has a programmable speed range from about 60 to about 1500 rpm. During loading of a disk into the test station the motor slows to a speed of about 300 rpm. Spindle 60 is driven directly from motor 58 so it also turns at the motor speed. Spindle 60 has a spindle cup located at its end for mating with the cone-nosed idler collet 62. During loading of a disk, idler collet 62 is in the retracted position. After the disk has dropped into position against bottom stops 66, the cone-nosed collet is extended through the disk aperture to the opposite spindle cup, gently centering and seating the disk between the spindle flanges with no distortion. The spindle drive speed is then controlled to a test speed of about 600 rpm to rotate the disk at this test speed. This disk loading takes only a short period of time.

During the insertion of the collet into the disk aperture, the disk jacket is clamped to hold and flatten the disk jacket but to allow the disk to rotate within the jacket. Jacket clamping is accomplished by a fixed anvil 68 positioned along the spindle side of the disk and a flexible pad 70 attached to and moving with collet 62. The pad forces the disk jacket gently but securely against the anvil.

Test station 56 also includes a read/write head assembly 72 which will be discussed more fully below. During the time when the disk is dropping into the test station and is being clamped between spindle 60 and collet 62, test head 72 is raised into position to place test heads against the disk through disk head windows 32 in disk jacket 26.

The disk is tested, as discussed below, and the test results are stored for later use. After testing, the speed of motor 58 is controlled to, for example 300 rpm, collet 62 is withdrawn from aperture 24, pad 70 is retracted to release the pressure on the disk jacket, test head 72 is lowered out of contact with the disk and moved horizonally to a position which is not directly beneath the disk, and the bottom means 66 are moved to allow the tested disk to drop into a shuttle platten 74 of the sorting mechanism 76. The stop means 66 are preferably moveable disk stop levers which are moveable by solenoids in response to a signal from the controlling microprocessor unit. The levers are pulled out of position to allow the disk to drop into the shuttle platten.

The sorting mechanism includes a shuttle platten 74 which rides on guide means 78 (shown more fully below) and is driven by a lead screw 80. The test results from the testing of the disk at test station 56 are stored in memory. Based on the test results stored in memory, shuttle platten 74 is driven horizontally to a position directly over a selected one of the output sort bins 82. The output sort bins are categorized, the disk is dropped, according to the test results, from the shuttle platten into a bin with disks having similar characteristics.

Figure 4:
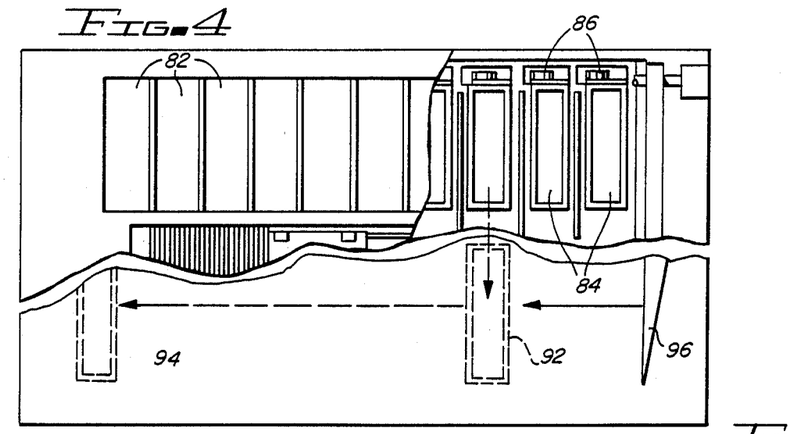
FIG. 4, in top view, illustrates removal of a filled box from an output bin.

FIG. 4 illustrates the output bin mechanism of the test apparatus as seen looking down in a cut-away view. The output bin mechanism includes a plurality of bins, here shown to be 10, with each of the bins corresponding to a preselected test category. In each of the bins is a removeable box 84 which can hold a number of flexible disks. Preferably the boxes can each hold about 15 tested disks. A pusher lever 86 located at the rear of each bin provides for the removal of a box from its bin when the box has been filled. As seen more clearly in FIGS. 5 and 6, the boxes 84 sit on a base plate 88. The levers and an associated actuator 90 are located beneath the base plate. When a box becomes filled with disks, as determined by the controlling microprocessor unit or chip, a signal from the controlling microprocessor energizes the selected actuator and causes the selected pusher lever to rotate to a vertical position and to extend through a slot (not shown in this view) through the base plate. The pusher lever pushes the box to an output area indicated by a dashed line location 92. The filled box is then pushed to an unloading area indicated by the dashed lines at 94 by an outrigger 96. The outrigger is conveniently attached to sorter shuttle platten 74 so that the same drive mechanism which moves the shuttle can also drive the outrigger.

Figure 5A:
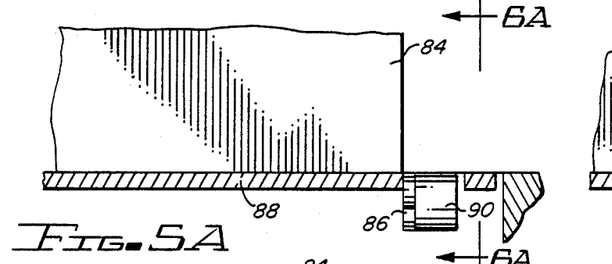
FIGS. 5a–5c and 6a–6b illustrate mechanism for replacing a filled box with an empty box.
Figures 5B, 6B:
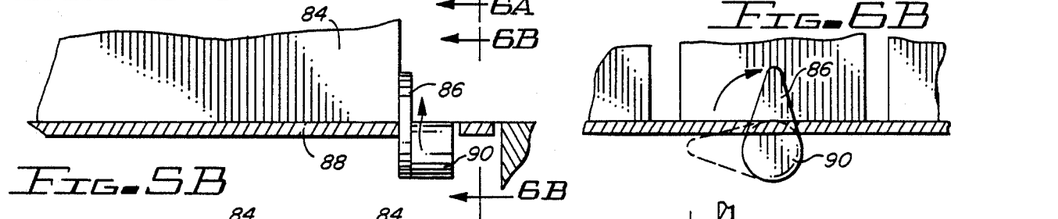
Figures 5C, 9, 10, 11:
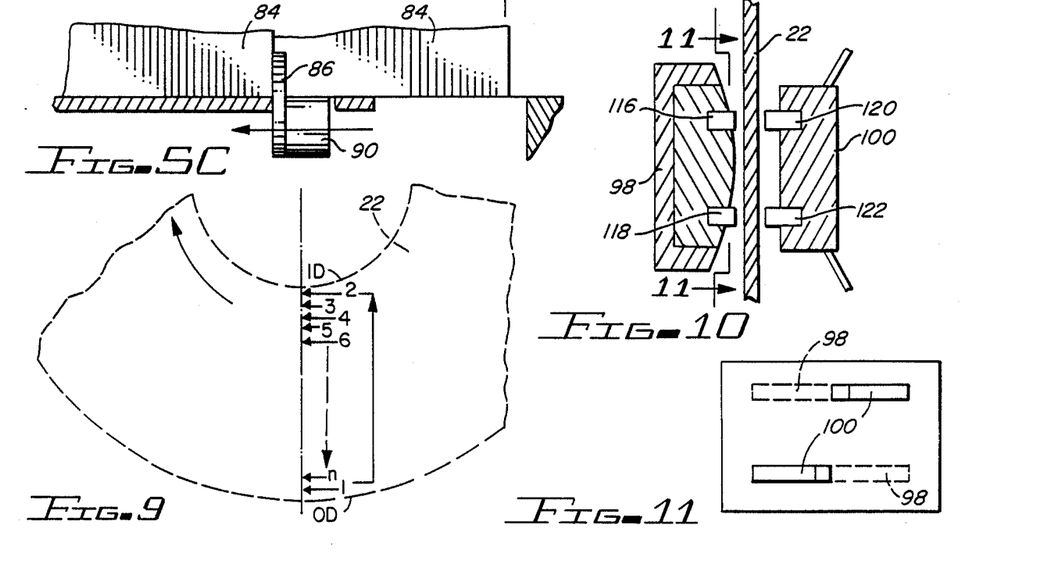
FIG. 9 illustrates track locations tested on a flexible disk.
FIGS. 10 and 11 illustrate read/write test heads.
Figure 6A:
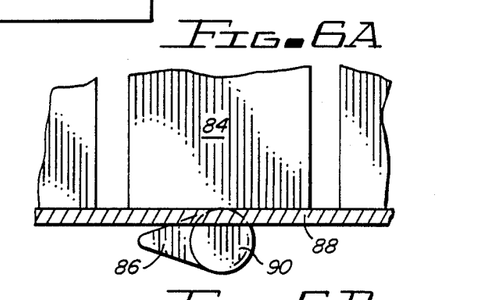

The operation of the pusher levers and actuators is shown more clearly in FIGS. 5 and 6 which show a side and end view, respectively. In FIGS. 5a and 6a lever 86 is shown to be in an inactivated position below base plate 88. In FIGS. 5b and 6b the lever for a selected box is rotated to an upright position ready to push against the end of the selected box. FIG. 5c illustrates one box being moved forward to position 92 while the adjacent box (not filled) remains in the original position.

The binning mechanism also includes a plurality of box reservoirs, each one of the reservoirs corresponding to one of the plurality of output bins. Reservoirs 128 illustrated in FIG. 1, together with the associated output bins, form an L-shaped magazine which rest on base plate 88. The reservoirs are filled with empty boxes 84 which are fed by gravity to the base plate as needed. When the lever mechanism 86 removes a filled box from the output bin, an empty box from the reservoir is replaced into that vacated position in the output bin by a similar lever mechanism, not shown in the drawings.

Figures 7, 8:
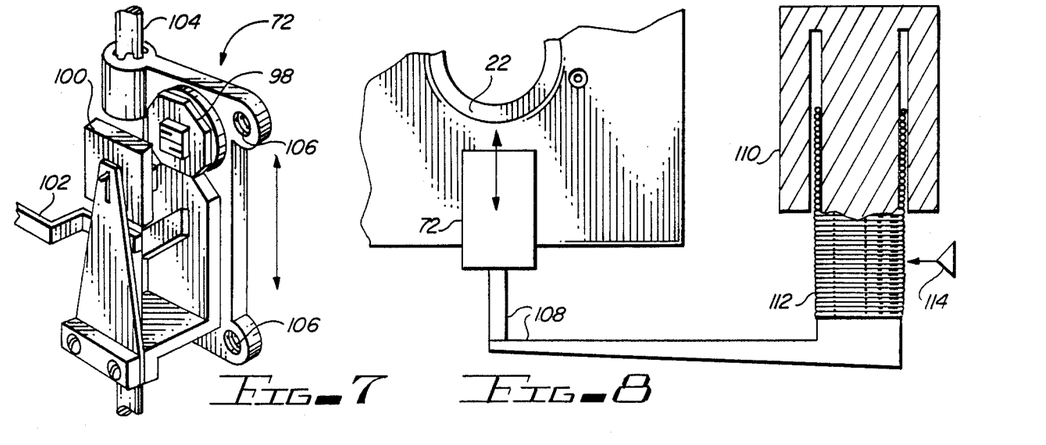
FIG. 7 illustrates, in perspective view, a read/write head assembly.
FIG. 8 illustrates position of the read/write head assembly during test and of drive means for moving the head assembly.

FIGS. 7-12 illustrate in more detail test head assembly 72 and its operation. As illustrated in FIG. 7, test head assembly 72 includes a first fixed test head pair 98 and a second spring load test head pair 100. During testing the test heads are positioned to contact the front and rear surfaces of the flexible disk through the head window openings in the disk jacket. Spring loaded disk head 100 causes the two heads to be in firm contact with the disk surfaces. A lever 102 is available for manually pulling the spring loaded disk head out of contact with the disk. A disk head assembly is physically attached to shaft 104. Means (in the form of arm 108) controls the vertical movement of the head assembly.

FIG. 8 schematically illustrates the vertical movement of the head assembly. Vertical movement is controlled by arm 108 which is connected to an air bearing assembly (not shown) that is coupled to and responsive to the movement of the wire coil assembly or actuator drive 110. Precise and controlled vertical movement of the head assembly is required to ensure that the heads are in contact with the correct track on disk 22. The precise control of the vertical movement is obtained through the use of a voice coil actuator drive 110 coupled with a ground glass scale 112 and a photo optical detector 114.

FIG. 9 illustrates the position and numbering of tracks on disk 22. Tracks are numbered from an OD at the outside of the disk to an ID located at the inside of the disk. The numbers shown in FIG. 9 depict the preferred order in which the tracks are tested. Standard track increments are only 0.020833 inch, track center-to-track center, for 48 track per inch disk and 0.010417 inch for 96 track per inch disk. Accordingly, with such fine incremental spacing, it is necessary that very precise positioning of the head assembly be maintained.

FIGS. 10 and 11 illustrate the positioning and arrangement of read/write heads on the head assembly, in accordance with the invention. FIG. 10 shows a cross-sectional view through the read/write heads and FIG. 11 illustrates a view perpendicular to that of FIG. 10. In a preferred embodiment, the dual read/write head assembly effectively test four tracks, two tracks on each side of the disk simultaneously. Each of the dual head assemblies contains two read/write cores, spaced four tracks apart. These are represented by 116, 118 on head 98 and by 120, 122 on head 100. While core 116 is testing tracks 31, 30, 29, and 28, core 118 is testing tracks 35, 34, 33, and 32. The heads are then moved out by five tracks and core 116 begins testing tracks 23, while core 118 begins testing track 27.

Figures 12, 13, 14:
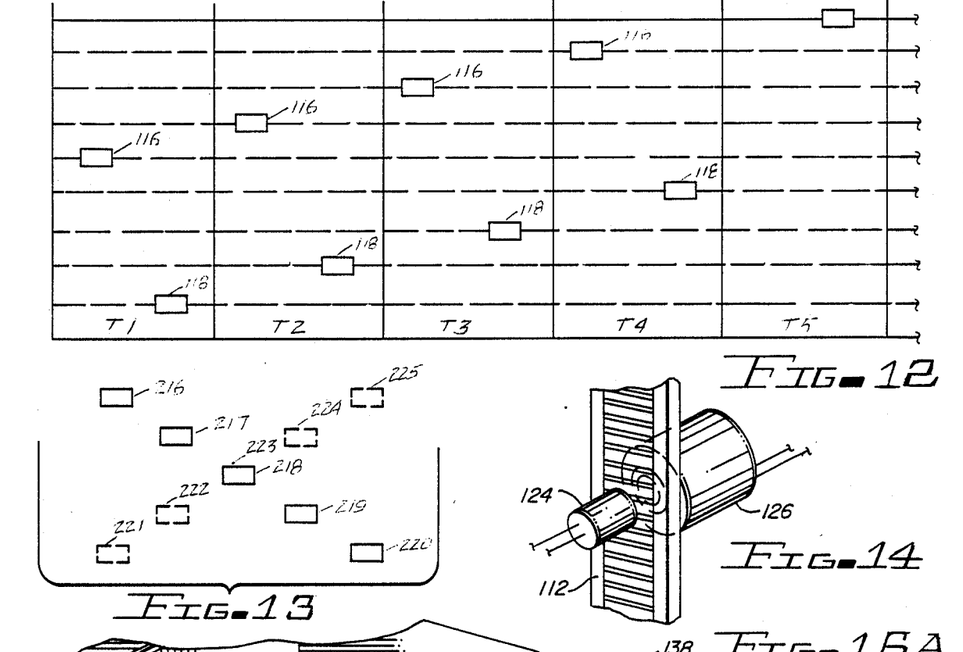
FIG. 12 illustrates a testing pattern for simultaneously testing two tracks on each side of a disk.
FIG. 13 illustrates an alternate embodiment having five read/write heads per test head.
FIG. 14 illustrates ground glass scale and photo optic detector for positioning read/write test heads.

The testing in this manner is shown schematically in FIG. 12. The position of the two test heads 116, 118 on the disk surface are shown to increment one track each period during the time T1-T4. Between periods T4 and T5, the heads move outwardly by five tracks, and then again increment in one-track steps.

FIG. 13 illustrates a further embodiment utilizing five read/write heads 216, 217, 218, 219, 220 and 221, 222, 223, 224, 225 on each of the heads of the head assembly. The increased number of heads allows the simultaneous testing of five tracks on each side of the disk.

FIG. 14 illustrates the ground glass scale and photo optical detector used for obtaining the precise positioning needed to move the head assembly controllably from track to track. The photo optic detector includes a light source 124 and a photo detector 126. Light from the source shines through the glass scale to the detector 126. Each track on the disk is represented by an interval of a number of grating lines on the glass scale. Track positioning is accomplished by a signal supplied to the voice coil actuator 110. The detector is coupled to the actuator and reads the grating lines on the glass scale, generating a clock pulse for each line counted. In moving up or down by one track, grating lines are counted and the voice coil movement is stopped after a desired number of up or down clock pulses have been received. The actual counting of pulses and control of the voice coil is controlled by a microprocessor unit.

Figures 15, 16A, 16B:
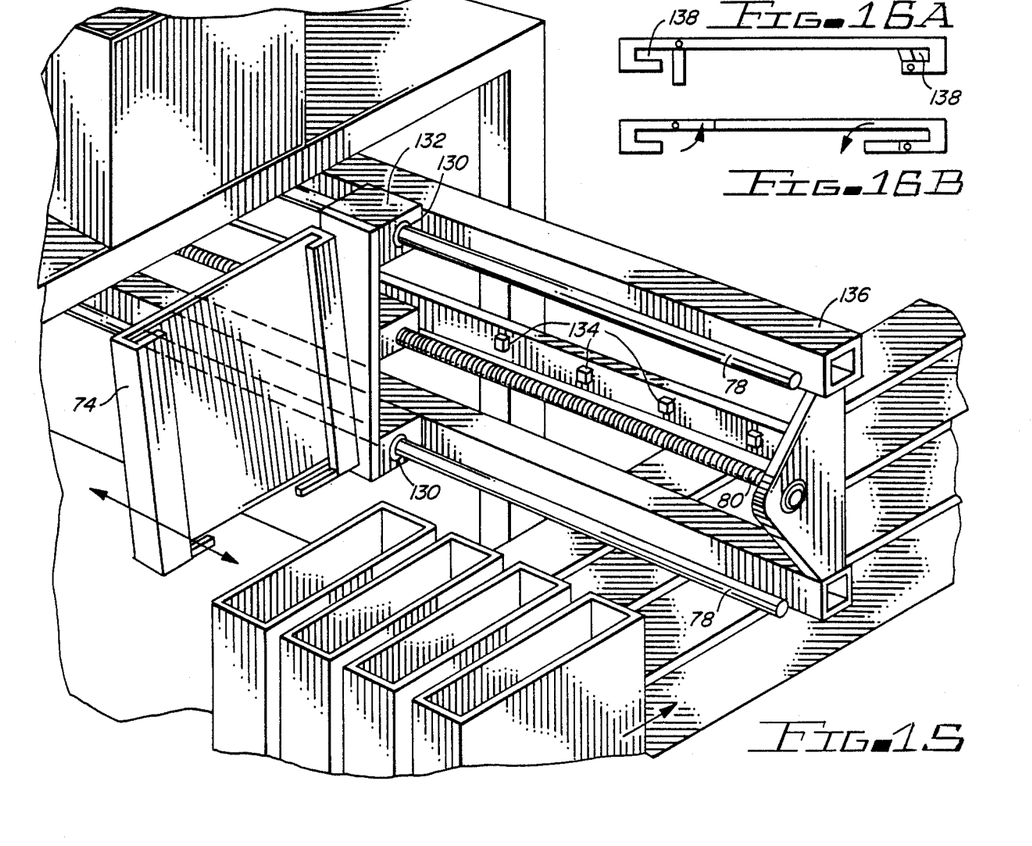
FIG. 15 illustrates the sort shuttle platen.
FIGS. 16A and 16B illustrates a release mechanism at the bottom of the sort shuttle platen.

FIGS. 15 and 16 illustrate the sorting mechanism in more detail. The sorter shuttle platten 74 accepts a disk dropped from the test station. The test apparatus memory contains test results obtained during testing relating to this disk. The sort shuttle platten, in response to the results contained in memory, carries that disk to a position over the proper output bin and then drops the disk into that bin. The shuttle platten rides on guide means 78 which can be, for example, a pair of horizontal, parallel polished rods. The rods pass through pillow blocks 130 on a bracket 132 to which the platten is attached. The motordriven shuttle platten 74 is moved along the guide means 78 by a lead screw 80. The lead screw, in turn, is driven by a reversible, DC shuttle motor (not shown) which is controlled in response to information about disk test results as determined by the control program of the microprocessor unit. Coupling between the shuttle motor and the lead screw is a positive drive chain (not shown). The exact positioning of the shuttle platten is controlled by a row of photo optic detectors 134 positioned on a line parallel with the lead screw that senses the platten position. Feedback from the position detectors controls the shuttle motor. Eleven photo optic detectors are used for ten output bins. One photo optic detector corresponds to each of the output bins and the eleventh detector corresponds to an extreme position used by the outrigger, attached to the shuttle platten, prior to the outrigger removing a box from the tenth output bin position. The photo optic detectors 134, guide means 78, and lead screw 80 are mounted on a fixed bracket 136.

FIGS. 16A and B illustrates the disk holding mechanism at the bottom of the shuttle platten. A shuttle platten has channel shaped edges 138 which control the lateral movement of the disk. The bottom of the platten is open except for moveable disk release means. These disk release means comprise, in a preferred embodiment, at least one solenoid activated lever (although two such levers are shown in FIGS. 16A and B) which can be selectively opened when the platten is positioned over the selected output bin. The levers are activated at the correct time in response to test results stored in the apparatus memory. Similar release means are used, for example, as the temporary stop 66 in the test station apparatus. FIG. 16A illustrates the levers in the closed position, and, FIG. 16B illustrates the levers in the open position.

Operation of the automated disk testing apparatus, in accordance with the invention is summarized as follows: a plurality of disk to be tested are loaded into the disk intake hopper and a slide weight is placed behind them, forcing the disks down against stops located at the lower end of the input hopper channel. The bottom disk in the hopper is contacted by the disk vacuum plate. The vacuum suction cup of the disk vacuum plate engages the disk and pulls the disk from the input hopper as the disk vacuum plate is moved away from the hopper. The disk vacuum plate positions the disk over the test station and the vacuum is removed, allowing the disk to drop into the test station. Prior to the time the disk drops into the test station, the collett and heads are retracted and the rotational speed of the motor is reduced. The cone nosed collett is extended through the disk aperture and into the opposite drive spindle to hold the disk securely against the drive spindle. The spindle drive speed is increased to the test speed and the test head assembly is brought into contact with the disk. A number of test are performed to completely categorize the disk. The dual head assembly tests both sides of the disk simultaneously. In a preferred embodiment, each of the two heads contain two read/write cores so that four tracks can be tested simultaneously, two on each side of the disk. The tests are performed by moving the test head assembly up or down to prescribed tracks on the disk. Precise control of the test assembly position is maintained by a voice coil actuator assembly coupled to a precision ground glass scale and an opto detector precision position sensor. After the disk has been fully characterized, the test head assembly is moved out of the test position, motor speed is reduced, the retractible collett is removed and the tested disk is allowed to drop into a sort shuttle platten. Test results obtained and stored during the testing of the disk control the movement of the sort shuttle platten to a position over a preselected output bin. The output bins are categorized to correspond to different disk qualities including reject, good one side, good other side, and various gradations of good either or both sides.

During the sort operation, another disk is dropped into test position. Total test time, including testing and sorting, is therefore reduced by overlapping the functions. When one box in the output becomes filled with tested disk, a pusher lever is actuated which removes the filled box from the output bin and replaces it with an empty box from a box reservoir. A filled box is then removed from the apparatus by an outrigger which pushes the filled box to the front of the apparatus for removal. Preferably, a color code or other visual indication can be used on each box to provide an identification of the type of tested product that is located therein.

Thus it is apparent that there has been provided, in accordance with the invention, an automated test apparatus and method for the testing of flexible disks which fully meets the objects and advantages set forth above. The invention has been described by reference to specific illustrative embodiments, but it is not intended that the invention be limited to these illustrative embodiments. Those skilled in the art will recognize, after review of the foregoing discussion, that variations and modifications differing from the illustrative embodiments are possible without departing from the spirit and scope of the invention. Accordingly, it is intended to encompass all such variations and modifications that fall within the appended claims.

We claim:

1. A test station for a testing apparatus for testing flexible disks, each of said disks contained in a standard disk jacket and having a central aperture, said test station comprising:
    means for receiving a released flexible disk;
    a drive motor mounted in fixed position and having a rotatable spindle;
    a spindle cup on the end of said rotatable spindle;
    a retractable cone-nosed idler collet positioned in alignment with said spindle cup and movable to extend through said aperture and into said spindle cup to center and seat a disk against said rotatable spindle;
    means for clamping said disk jacket and permitting a flexible disk contained therein to rotate freely;
    means for releasing said flexible disk after testing including disk stop levers capable of moving to allow said flexible disk to drop downwardly from said test station, wherein said drive motor is speed controlled to have a first rotational speed during disk loading and a second higher rotational speed during disk testing.

2. The test station of claim 1 wherein said means for clamping said disk jacket comprises:
    a solid, fixed anvil and a movable foam pad, said anvil and pad positioned to allow a disk and disk jacket to be placed therebetween; and
    drive means to force said pad toward said anvil.

3. The test station of claim 2 wherein said drive means is adjustable to allow clamping of said disk jacket between said pad and said anvil and allowing said disk to rotate within said disk jacket.

4. A test station for a testing apparatus for testing flexible disks, each of said disks contained in a standard disk jacket and having a central aperture, said test station comprising:
    a drive motor mounted in fixed position and having a rotatable spindle;
    a spindle cup on the end of said rotatable spindle;
    a retractable cone-nosed idler collet positioned in alignment with said spindle cup and movable to extend through said aperture and into said spindle cup to center and seat a disk against said rotatable spindle;
    means for clamping said disk jacket;
    means to release said flexible disk after testing;
    stop means for initially holding a disk dropped into the said test station, wherein said stop means comprises a frame member having channel shaped sides into which said disk can drop and bottom means comprising movable disk stop levers;

solenoids for controllably operating said disk stop levers; and a read/write head assembly, and wherein said head assembly comprises a first fixed test head for testing a first side of said disk and a second spring loaded test head for testing a second side of said disk.

5. The test station of claim 4 wherein said first and second test heads are positioned to clamp said disk therebetween.

6. The test station of claim 4 wherein each of said first and second test heads comprise dual read/write cores.

7. The test station of claim 4 wherein said read/write head assembly is mounted on a shaft.

8. The test station of claim 7 further comprising drive means for moving said head assembly to selectively position said head assembly against said disk being tested.

9. The test station of claim 8 wherein said drive means comprises a voice coil actuator.

10. The test station of claim 8 further comprising control means for controlling said drive means and for selectively positioning said head assembly.

11. The test station of claim 10 wherein said control means comprises a photodetector assembly and ground glass scale.

12. The test station of claim 10 wherein said control means comprises means to detect the position of said test head assembly and feedback means to said drive means.

13. The test station of claim 4 wherein said read/write head assembly is horizontally moveable to and from a test position.

14. A sorting mechanism for use with a testing apparatus for testing flexible disks, said flexible disks tested at a test station and then released from said test station, wherein signals resulting from said disk testing are stored, said sorting mechanism comprising:

a shuttle platten for receiving said disk released from said test station;

guide means for carrying said shuttle platten;

drive means for moving said shuttle platten on said guide means, said drive means responsive to said stored resulting signals;

a plurality of output bins for receiving disks from said shuttle platten; and means for releasing said disks into a container in an output bin determined by said resulting signals and means for removing said container from an output bin when said container is filled.

15. The sorting mechanism of claim 14 wherein said shuttle platten comprises a frame of channel-shaped material.

16. The sorting mechanism of claim 15 wherein said shuttle platten comprises a frame of channel-shaped material, said frame having an opening at the bottom thereof through which said disk can pass, and said disk release means comprise solenoid activated lever means for selectively closing said opening.

17. The sorting mechanism of claim 16 wherein said levers are operable in response to said stored resulting signals.

18. The sorting mechanism of claim 14 wherein said quide means comprise:

pillow blocks coupled to said shuttle platten; and horizontal parallel guide bars mounted to said testing apparatus and passing through said pillow blocks.

19. The sorting mechanism of claim 14 further comprising means to monitor the position of said shuttle platten on said guide means.

20. The sorting mechanism of claim 19 wherein said means to monitor comprises a plurality of photo detectors positioned along said guide means.

21. The sorting mechanism of claim 14 wherein said drive means comprises:

a shuttle motor;

a lead screw coupled to said shuttle platten; and coupling means between said shuttle motor and said lead screw.

22. The sorting mechanism of claim 21 wherein said shuttle motor comprises a reversible motor.

23. A sorting mechanism for use with a testing apparatus for testing flexible disks, said flexible disks tested at a test station, wherein signals resulting from said disk testing are stored and said flexible disks are released from said testing station, said sorting mechanism comprising:

a shuttle platten for receiving the disk released from the test station;

guide means for carrying said shuttle platten;

drive means for moving said shuttle platten on said guide means, said drive means responsive to said stored resulting signals, said drive means including a reversible shuttle motor, a lead screw coupled to said shuttle platten, and a drive chain from the shaft of said shuttle motor to said lead screw;

a plurality of output bins for receiving disks from said shuttle platten; and means for releasing said disks into an output bin determined by said resulting signals.

24. Output bin mechanism for test apparatus for testing flexible disks, said disks categorized by said testing apparatus, said mechanism comprising:

a plurality of bins, each of said bins corresponding to a preselected test category;

a removable box in each of said bins, each of said boxes having a size to hold a plurality of disks;

means for removing a box from said bin when said box is full; and a plurality of reservoirs, each of said reservoirs corresponding to one of said plurality of bins, said reservoirs capable of holding a plurality of said boxes for replacing a box removed from a bin.

25. The mechanism of claim 24 wherein each of said reservoirs together with the associated one of said plurality of bins forms an L-shaped magazine positioned on a base plate.

26. The mechanism of claim 25 wherein said L-shaped magazine comprises a vertical reservoir section capable of holding a plurality of said boxes which are fed by gravity to said base plate and a horizontal bin section positioned on said base plate and including an output sort bin location.

27. The mechanism of claim 26 further comprising means for moving said boxes through said horizontal bin section along said base plate to replace a filled box in said output sort bin location.

28. The mechanism of claim 27 wherein said means for moving comprises a plurality of retractable pusher levers mounted on slide bars positioned under said base plate and selectively extensible up through slots in said base plate.

29. The mechanism of claim 28 wherein said pusher levers are positioned to selectively engage one of said boxes to slide said box across said base plate to said output sort bin location.

30. The mechanism of claim 24 further comprising: means for removing a filled box from said test apparatus.

31. A method of handling flexible disks in an automated testing apparatus which comprises the steps of:
loading a plurality of said disks, in standard disk jackets, into a gravity feed input hopper;
sequentially contacting each of said disks with a vacuum disk plate and vacuum pulling one of said disks from said hopper;
dropping said disk from said vacuum disk plate into a test station;
positioning and clamping said disk against a rotating hub;
rotating said hub and said disk at a predetermined test rotation speed;
contacting said disk during said rotation by a disk test head;
exchanging signals between said test head and said disk;
storing information responsive to said exchanging signals in a test station memory, disengaging said disk from said test station and dropping said disk into a sort shuttle frame;
transporting said disk in said frame to a location over a preselected output bin, said bin selected in response to said information stored in said test station memory; and
releasing said disk into said output bin, and wherein during said step of transporting, another of said plurality of said disks is undergoing said steps of contacting and dropping.

32. The method of claim 31 further comprising the step of:
monitoring the position of said sort shuttle frame by a plurality of photo optic detectors.

33. The method of claim 31 further comprising the steps of:
placing a box in said output bin to collect disks released into said output bin;
monitoring the number of disks in said box; and
removing said box when a predetermined number of disks have been placed therein.

34. The method of claim 33 further comprising the step of pushing said removed box to an output removeable location.

35. The method of claim 31 wherein said step of positioning and clamping comprises providing a retractable cone-nose idler collet in alignment with said rotating hub and moving said collet to extend through an aperture in said disk.

36. The method of claim 31 further comprising the step of:
clamping said disk jacket to hold and flatten said disk jacket during rotation of said disk.

37. A test station for a testing apparatus for testing a flexible disk, each of said disks contained in a standard disk jacket and having a central aperture, said test station comprising:
a frame mechanism for receiving and containing a released flexible disk;
a drive motor mounted in fixed position and having a rotatable spindle;
a spindle cup on the end of said rotatable spindle;
a retractable collet positioned in alignment with said spindle cup and removable to extend through said aperture and into said spindle cup to seat said disk against said rotatable spindle; and
a read/write head assembly positioned to test said disk, wherein said frame mechanism includes a movable bottom member capable of moving to allow said flexible disk to drop from said test station when said collet is retracted and said read/write head is removed from said test position, and wherein said head assembly comprises a first fixed test head and a second spring loaded test head, said first and second test heads positioned to clamp said disk therebetween.

38. The test station of claim 37 wherein said each of said first and second test heads comprises dual read/write cores.

39. The test station of claim 37 wherein said read/write head assembly is mounted on a shaft.

40. The test station of claim 39 further comprising drive means for moving said head assembly to selectively position said head assembly proximate a selected track on said disk.

41. The test station of claim 40 wherein said drive means comprises a voice coil actuator.

42. The test station of claim 40 further comprising control means for controlling said drive means and for selectively positioning said head assembly.

43. The test station of claim 42 wherein said control means comprises a photo detector assembly and a ground glass scale.

44. The test station of claim 37 wherein said drive motor comprises a variable speed motor having precision speed control at a preselected test speed.

45. A sorting mechanism for a testing apparatus for testing a flexible disk, said flexible disk tested at a test station and then released from said test station, said sorting mechanism comprising:
a shuttle platten for receiving said released disk;
guide means for carrying said shuttle platten;
a shuttle motor and lead screw for moving said shuttle platten on said guide means;
means to monitor the position of said shuttle platten on said guide means;
feedback means from said means to monitor to said shuttle motor;
means associated with said shuttle platten for releasing said disk from said shuttle platten;
output bins for receiving said disk from said shuttle platten, said bins including removable boxes; and
means for removing said boxes from said sorting mechanism when said boxes are filled.

46. A sorting mechanism of claim 45 wherein means to monitor comprises:
a plurality of photodetectors positioned along a line parallel to said lead screw.

47. A sorting mechanism for use with a testing apparatus for testing flexible disks, said flexible disks tested at a test station and then released from said test station, wherein signals resulting from said disk testing are stored, said sorting mechanism comprising:
a shuttle platten for receiving said disk released from said test station;
guide means for carrying said shuttle platten;
drive means for moving said shuttle platten on said guide means, said drive means responsive to said stored resulting signals;

a plurality of output bins for receiving disks from said shuttle platen, each of said output bins including a removable box, said removable box being removable from said output bin in response to a signal;

a projection coupled to said shuttle platen for transporting said removable boxes to an exit location of said testing apparatus; and means for releasing said disks from said shuttle platten into an output bin determined by said resulting signals.

* * * * *